(12) United States Patent
Redford

(10) Patent No.: US 9,896,643 B2
(45) Date of Patent: Feb. 20, 2018

(54) LIGHT PHASE PRODUCT RECOVERY METHODS AND SYSTEMS

(71) Applicant: POET RESEARCH, INC., Sioux Falls, SD (US)

(72) Inventor: Steven Redford, Brandon, SD (US)

(73) Assignee: POET RESEARCH, INC., Sioux Falls, SD (US)

( * ) Notice: Subject to any disclaimer, the term of this patent is extended or adjusted under 35 U.S.C. 154(b) by 322 days.

(21) Appl. No.: 14/157,496

(22) Filed: Jan. 16, 2014

(65) Prior Publication Data

US 2015/0197707 A1    Jul. 16, 2015

(51) Int. Cl.
| | |
|---|---|
| *B01D 21/02* | (2006.01) |
| *B01D 21/26* | (2006.01) |
| *C11B 3/00* | (2006.01) |
| *C11B 13/00* | (2006.01) |
| *B01D 21/24* | (2006.01) |

(52) U.S. Cl.
CPC .............. *C11B 3/008* (2013.01); *C11B 13/00* (2013.01); *B01D 21/02* (2013.01); *B01D 21/262* (2013.01); *Y02E 50/17* (2013.01); *Y02W 30/74* (2015.05)

(58) Field of Classification Search
CPC ....... B01D 21/02; B01D 21/262; C11B 13/00; C11B 3/008; Y02W 30/74
See application file for complete search history.

(56) References Cited

U.S. PATENT DOCUMENTS

| | | |
|---|---|---|
| 7,842,484 B2 | 11/2010 | Lewis |
| 8,470,550 B2 | 6/2013 | Lewis |
| 8,702,819 B2 | 4/2014 | Bootsma |
| 9,061,987 B2 | 6/2015 | Bootsma |
| 2004/0234649 A1 | 11/2004 | Lewis et al. |
| 2008/0110577 A1 | 5/2008 | Winsness |
| 2013/0109873 A1 | 5/2013 | Bootsma |
| 2013/0281280 A1* | 10/2013 | Agarwal ............ B01D 17/0217 494/37 |
| 2013/0344554 A1 | 12/2013 | Bleyer et al. |
| 2014/0186907 A1 | 7/2014 | Bootsma |
| 2015/0037857 A1 | 2/2015 | Redford |
| 2015/0291923 A1 | 10/2015 | Bootsma |
| 2017/0051322 A1 | 2/2017 | Bushong et al. |

FOREIGN PATENT DOCUMENTS

| | | |
|---|---|---|
| WO | 2012/145230 A1 | 10/2012 |
| WO | 2013/126561 A1 | 8/2013 |
| WO | 2017/059083 A1 | 4/2017 |

OTHER PUBLICATIONS

Flottweg SE, "Flottweg Centrifuges for Olive Oil Production: High Quality Separation Technology" Flottweg Separation Technology No. PR-0004 ZJ-10, May 2013, pp. 1-16.*
International Search Report and Written Opinion from International Application No. PCT/US2015/011666, dated May 7, 2015 (8 pages).

* cited by examiner

*Primary Examiner* — Chris R Tate
*Assistant Examiner* — Aaron J Kosar

(57) ABSTRACT

Methods and systems for recovering a desired co-product from a feedstock to ethanol production process are provided. The methods involve a multi-step separation of a fermentation-derived feedstock, in which an initial separation produces a discharge stream and an output feed stream including the co-product, and a final separation further purifies the output feed stream while also producing a recycle stream that is reintroduced into the separation process. The systems include at least an initial and at least a final separation device which are in fluid communication in both upstream and downstream directions. The initial separation device separates at least a portion of a non-co-product containing phase from a feed stream comprising the non-co-product containing phase and a co-product containing phase, and the final separation device separates at least a portion of the co-product containing phase from a stream comprising the co-product containing phase and a non-co-product containing phase.

11 Claims, 2 Drawing Sheets

LIGHT PHASE PRODUCT RECOVERY METHODS AND SYSTEMS

FIELD

This specification relates to methods and systems for recovering a light phase product from a product stream including both a light phase and a heavy phase. This specification also relates to methods and systems for recovering oil generated in feedstock-to-ethanol fermentation conversion processes, in which the feedstock is an oil-containing, grain-based biomass such as corn.

BACKGROUND

Ethanol can be produced from sugar- or starch-based feedstock such as sugarcane, sugar beet, sweet sorghum, cereal grains (e.g. corn), cassava, potato, and sweet potato. In a conventional ethanol plant producing ethanol from corn, starch from the corn is fermented and produces beer. A beer distillation process separates whole stillage from ethanol. The whole stillage may be further processed to produce oil-containing syrup by separating out solids from the whole stillage to produce thin stillage and wet cake. The thin stillage may be thereafter concentrated into the oil-containing syrup.

SUMMARY

The present disclosure relates to methods and systems for recovering a light phase product from a product stream comprising a light phase and a heavy phase. For example, the present disclosure relates to methods and systems for recovering oil from the beer, whole stillage, thin stillage or syrup produced when an oil-containing, grain-based feedstock, such as corn, is converted to ethanol using a fermentation process. In some embodiments, the present disclosure relates to high-efficiency methods and systems for recovering oil, such as recovering greater than 40%, or at least about 45%, or at least about 50%, or at least about 55%, or at least about 60%, or at least about 65%, or at least about 70%, or at least about 75%, or at least about 80%, or at least about 85%, or at least about 90%, or at least about 95% of the oil present in the process feed stream. In some embodiments, the disclosure relates to methods and systems for recovering greater than about 53% of the oil present in the process feed stream. In some embodiments the disclosure relates to methods and systems for recovering at least about 97% of the oil present in the process feed stream. In some embodiments, the disclosure relates to methods and systems for recovering at least about 99% of the oil present in the process feed stream.

In some embodiments, the methods of this disclosure involve a multi-step separation process including at least an initial separation and a final separation of a fermentation-derived stream (the "process feed stream") which has a light phase and a heavy phase, wherein: the initial separation results in a light phase stream, which serves as the feed stream for the final separation (and is therefore also referred to herein as the "final separation feed stream") and a heavy phase discharge stream, wherein the final separation feed stream comprises more light phase than the heavy phase discharge stream, and the heavy phase discharge stream comprises more heavy phase than light phase; and, the final separation results in an oil-containing stream and a recycle stream. In some embodiments, the initial separation includes more than one separation process, the final separation includes more than one separation process, or both the initial and final separations include more than one separation process. In addition, any of the streams may optionally be further processed prior to or during the multi-step separation process. For example, the level of solids in the fermentation-derived stream may be reduced prior to initiating the multi-step separation process, such to achieve a level of solids that is compatible with the device(s) used in the separation process. As another example, if the final separation feed stream includes emulsion, it may undergo an emulsion-breaking process, such as adding chemicals to the final separation feed stream in order to break at least a portion of any emulsion that may be present in the stream.

In some embodiments, the initial separation separates the (optionally solids-reduced) fermentation-derived stream into a dirty light phase stream and a clean heavy phase discharge stream, and the final separation separates the dirty light phase stream into a clean, oil-containing stream and a dirty recycle stream. In some such embodiments, the initial separation is performed using an inner-rising disk-stack centrifuge and the final oil-recovery separation is performed using an outer-rising disk stack centrifuge. The clean heavy phase discharge stream may be further processed (e.g., may be distilled) to recover ethanol.

In some embodiments, the initial separation involves at least two separations, a first initial separation and a second initial separation. In some such embodiments, the first initial separation separates the fermentation-derived stream into a dirty light phase stream and a clean heavy phase discharge stream, for example using an inner-rising disk-stack centrifuge; the second initial separation separates the dirty light phase stream into the final separation feed stream and an enriched stream, for example using a center-rising disk-stack centrifuge; the enriched stream is recycled into the fermentation-derived feed stream for use as a feed stream for the first initial separation. In other embodiments, the enriched stream may be discharged from the process altogether, or may be combined with the heavy phase discharge stream for further processing, including distillation, for recovering ethanol.

In some embodiments of the multi-step separation process, the fermentation-derived stream is beer produced in a corn-to-ethanol fermentation process, the level of solids in the beer may be reduced prior to the initial separation, for example to less than about 3% by weight, and the various separations are accomplished using disk-stack centrifuges. For example, the initial separation may be accomplished using an inner-rising disk stack centrifuge and the final separation may be accomplished using an outer-rising disk-stack centrifuge. In some embodiments, when the initial separation includes a first initial separation and a second initial separation, the first initial separation may be accomplished using an inner-rising disk stack centrifuge, the second initial separation may be accomplished using a center-rising disk stack centrifuge and the final separation may be accomplished using an outer-rising disk stack centrifuge.

The present disclosure also relates to systems for recovering a light phase product from a heavy phase product. In some embodiments, the system is an oil-containing, grain-based feedstock-to-ethanol (for example a corn-to-ethanol) system which includes an ethanol fermentation system for producing beer from feedstock sugars, and an oil recovery system in fluid communication with the ethanol fermentation system. The oil recovery system is configured to recover the oil directly from the beer or indirectly from the beer such as from the whole stillage, thin stillage, or syrup. In some embodiments, the oil recovery system includes: an initial separation sub-system configured to separate a fermentation-derived stream including a light phase and a heavy phase into: 1) a light phase stream ("final separation feed stream"), which may be a dirty light phase stream; and, 2) a heavy phase discharge stream, which may be a clean heavy phase discharge stream, wherein the final separation feed stream comprises more light phase than the heavy phase discharge stream and the heavy phase discharge stream comprises more heavy phase than light phase (including, for example, little to no light phase); and, a final separation sub-system configured to separate the final separation feed stream (or stream derived therefrom) into an oil-containing stream (which may be a clean light phase stream) and a recycle stream (which may be a dirty heavy phase stream) and configured to direct the recycle stream into a feed stream for a separation upstream of the final separation, for example the recycle stream may combine with a feed stream for the initial separation.

In some embodiments, the initial separation sub-system comprises a first inner-rising disk-stack centrifuge in upstream fluid communication with a first center-rising disk stack centrifuge, wherein the first inner-rising centrifuge is configured to separate (an optionally solids-reduced) fermentation-derived stream into a light phase stream (e.g., a dirty light phase stream) and a heavy phase discharge stream (e.g., a clean heavy phase stream), and the first center-rising centrifuge is configured to separate the light phase stream (or stream derived therefrom) into the final separation feed stream and an enriched stream (i.e., a light phase-enriched stream). The enriched stream may be recycled for use as part of a feed stream for the first inner-rising disk stack centrifuge.

In other or further embodiments, the oil recovery system further includes a solids removal sub-system, an emulsion-breaking sub-system or both. In some embodiments, the solids removal sub-system may be located upstream of and in fluid communication with the initial separation sub-system and is configured to remove at least a portion of any solids present in the fermentation-derived stream. In some embodiments, the emulsion-breaking system may be located downstream of and in fluid communication with the initial separation sub-system and is configured to break at least a portion of any emulsion present in the final separation feed stream (e.g. a dirty light phase discharge stream from the initial separation).

The identified embodiments are exemplary only and are therefore non-limiting. The details of one or more non-limiting embodiments according to the disclosure are set forth in the accompanying drawings and the descriptions below. Other embodiments according to the disclosure should be apparent to those of ordinary skill in the art after consideration of the present disclosure.

DETAILED DESCRIPTION

Figure 1:
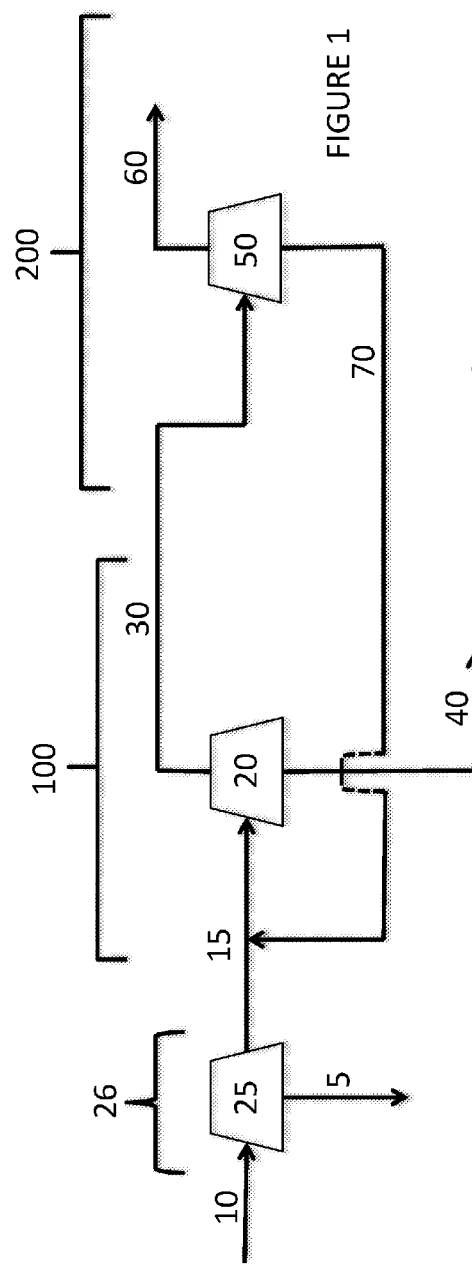
FIG. 1 is a process flow diagram of an embodiment of a method according to this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common United States patent law definition of "comprising" and is therefore interpreted to be an open term meaning "at least the following" and also interpreted not to exclude additional features, limitations, aspects, etc.

The term "about" is meant to account for variations due to experimental error or to permit deviations from the measurements that don't negatively impact the intended purpose. All measurements or numbers are implicitly understood to be modified by the word about, even if the measurement or number is not explicitly modified by the word about.

The term "substantially" is meant to permit deviations from the descriptive term that don't negatively impact the intended purpose. All descriptive terms are implicitly understood to be modified by the word substantially, even if the descriptive term is not explicitly modified by the word substantially.

Where ever the terms "a" or "an" are used, "one or more" is understood unless explicitly stated otherwise or such interpretation is nonsensical in context.

The phrase "in fluid communication" should be interpreted to mean "directly or indirectly in fluid communication" regardless of whether the phrase "directly or indirectly" explicitly appears in the text, unless explicitly stated otherwise.

Where ever the text refers to extracting, separating, purifying or the like, it is understood that the action may not result in a complete extraction, separation or purification. For example, where ever the text refers to separating a feed stream into a heavy phase stream and a light phase stream, the heavy phase stream may include some light phase or components of the light phase and the light phase may include some heavy phase or components of the heavy phase. Likewise, the term "purify" and the like does not mean 100% pure but rather only that the target product is not part of the same original mixture in which it is found. Accordingly, where the specification refers to recovering "oil" it is understood that an oil product (also interchangeably referred to as an oil composition) may be recovered. As a person of skill understands, the recovered oil may not be 100% pure and may include other components.

As discussed herein, the systems and methods of this disclosure separate feed streams comprising a light phase and a heavy phase into a light phase stream and a heavy phase stream. In either case, the light phase stream may include an amount of heavy phase and the heavy phase stream may include an amount of light phase. In some embodiments, the streams may be referred to as "clean" streams (e.g. a "clean" heavy phase stream) or "dirty" streams (e.g. a "dirty" light phase stream). The phrase "clean" does not exclude the presence of both phases in the stream but only implies that the "clean" stream does not include more of the other phase than may be desirable taking into consideration, for example, the use of the stream, technical and/or economic factors. The phrase "dirty"

implies that the stream contains more of the other phase than may otherwise be desired. For example a "clean" phase is sufficiently clean for the intended purpose that it may be removed from the multi-step separation system. For example, as described herein, a clean heavy phase discharge is not required to be recycled back into, or further processed by, the system but may for example proceed to distillation for recovery of ethanol. As another example, a clean light phase is also not required to be recycled back into the system but may represent or comprise the recovered oil product. On the other hand, dirty and/or enriched phases described herein are generally subjected to further separations (either through upstream recycle or downstream separation) in the multi-step separation system. In some embodiments, a separation device which produces a dirty light phase stream and a clean heavy phase stream will not lose more than 20% of the light phase to the heavy phase stream. In some embodiments the clean heavy phase stream may have as little as 3% or as little as 1% by weight light phase. For example, an inner-rising disk-stack centrifuge extracts a substantial portion of the heavy phase of a stream comprising a heavy phase and a light phase resulting in a clean heavy phase stream and a dirty light phase stream.

The term "feed stream" may be used to describe a discharge stream produced by a first separation device (such as a centrifuge, including a disk-stack centrifuge) when that discharge stream is directed into a second separation device downstream of the first separation device and serves as the feed stream for that second separation device. The term "recycle stream" when used to describe a discharge stream produced by a first separation device means a discharge stream that is not the primary product-containing stream and is not discarded, but for example is directed into a second separation device either upstream or downstream of the first separation device. "First" and "second" do not mean that the separation devices are the first and second devices in a system but merely that they are distinct devices (although the first and second separation device may be the same type of separation of separation device).

With specific reference to the herein described multi-step separation processes, comprising an initial separation and a final separation:

"Process feed stream" means the fermentation-derived stream which is to be separated by the processes disclosed herein. The "process feed stream" is reference number 15 (and 10) in the accompanying figures.

The "final separation feed stream" is the feed stream for the final separation process 200, and may be the discharge stream from the initial separation 100 (or a stream derived therefrom). In the illustrated embodiments herein, the "final separation feed stream" is reference number 30 in the accompanying figures, which is also the discharge stream from the initial separation 100. "Final separation feed stream" 30 does not denote a specific composition; it only refers to the feed stream for the second separation process 200. Thus, for example, the final separation feed stream 30 for an embodiment of FIG. 1 may have a different composition than a final separation feed stream 30 for an embodiment of FIG. 2, such as a different ratio of light phase to heavy phase, and/or a different percent emulsion.

When the initial separation 100 includes more than one separation process, each separation step produces: at least one discharge stream that is directed downstream for further processing, ultimately into the final separation feed stream; and, at least one other discharge stream, for example which may be discharged from the process or which may be recycled back into the process.

An "enriched stream" is a discharge stream which is not the primary product-containing discharge stream, but contains sufficient light phase product (as determined for example by user preference) to merit recycle back into the light phase product recovery process. For example, the enriched stream may be combined with the process feed stream which is the feed stream for the first initial separation process.

A "recycle stream" is a discharge stream that is recycled back into the light phase product recovery process, rather than discharged from the process. A recycle stream may be, for example, a dirty discharge stream or, as another example, an enriched discharge stream.

The term "emulsion" means "emulsion composition," and thus encompasses 100% emulsion as well as compositions containing at least a portion of an emulsion. For example, where the disclosure (including claims) refers to a stream (e.g., fermentation-derived stream, final separation stream) which comprises emulsion, it is understood that the stream may for example include 100% oil emulsion or it may for example include an oil emulsion and free oil.

Although various streams described herein may include dissolved solids, suspended solids or combinations thereof (total solids being the combination of suspended solids and dissolved solids), the term "solids" as used herein refers to suspended solids. Accordingly, "reducing the amount of solids" means reducing the amount of suspended solids. Similarly, "percent solids" refers to percent suspended solids.

The present disclosure relates to methods and systems for recovering oil produced in an oil-containing, grain-based feedstock-to-ethanol fermentation process. For example, the disclosure relates to methods and systems for recovering oil produced in a corn-to-ethanol fermentation process, for example high efficiency systems and methods for recovering oil produced in a corn-to-ethanol fermentation process.

In a typical conventional corn-to-ethanol fermentation process, starch present in corn is broken down into simple sugars, which can be fermented by an ethanologen such as yeast into ethanol. The corn to ethanol fermentation process can also produce co-products such as oil, syrup, carbon dioxide, bio-based chemicals, fat, fiber and other nutrients, some or all of which may be used to produce animal feed. There are two main corn-to-ethanol production processes: wet mill and dry mill.

In traditional wet mill ethanol production, corn is soaked in water to soften the grain and facilitate separating the various components of the corn kernel. After "steeping", various components such as starch, fiber and germ are separated from one another for separate processing into a variety of products. Although the systems and processes described herein may be adapted to wet mill ethanol production, for example to recover oil in the starch-washing discharge stream, the present disclosure will describe the processes and systems with reference to dry mill ethanol production processes.

Traditional dry mill ethanol production processes typically involves five basic steps: milling, liquefaction, saccharification, fermentation, distillation and recovery. In the milling step, corn is ground into flour, which is slurried with water to form a mash. In the saccharification step, enzymes are added to the mash to convert the corn starch into simple sugars. The fermentation of the sugars by an ethanologen such as yeast produces a beer which is separated into ethanol and whole stillage by distillation. The whole stillage may be subject to further processing wherein it is separated into wet cake and thin stillage. The thin stillage passes through evaporators to produce a syrup, which may be recombined and dried with the wet cake to produce distillers grains with soluble (DDGS), an animal feed. Not all dry mill ethanol production processes involve all the identified steps. For example, in some dry mill ethanol production processes, saccharification and fermentation are not independent steps but occur simultaneously. As another example, some dry mill ethanol production processes do not involve liquefaction.

Oil found in corn is released during the dry mill process. For example, the grinding of the corn along with fermentation releases the corn oil into the beer. As the beer passes through distillation and becomes whole stillage the majority of oil travels with it. When the solids are separated from the whole stillage creating thin stillage and wet cake, a portion of the oil leaves with the wet cake and another portion of the oil goes with the thin stillage, thereafter remaining in the syrup after the thin stillage undergoes evaporation.

The present disclosure relates, in part, to systems and processes for recovering oil produced in oil-containing, grain-based feedstock-to-ethanol processes. In some embodiments, the present disclosure provides systems and processes for recovering oil prior to distillation and evaporation. Said otherwise, although oil is conventionally recovered from syrup, the systems and processes of this disclosure may be used to recover oil from beer. In some embodiments, recovering oil from beer may have one or more of the following benefits: upstream processing may be minimized and/or the quality of the oil may be improved. More specifically, removing oil from beer (before distillation and evaporation) means the oil is exposed to less heat and/or fewer recycle steps and consequently fewer actions which can degrade its quality. And, although the main example herein is based on recovering oil from beer, a person of skill upon reading this disclosure will appreciate that the methods and systems of the disclosure may be adapted (and will appreciate how to adapt the example methods and systems) to recover oil from whole stillage, thin stillage, syrup, and/or will appreciate how to adapt the example methods and systems more generally to recover a light phase product from a heavy phase product.

Referring now to the figures, wherein like reference numerals indicate like elements, FIG. 1 is a process flow diagram of an embodiment of a method for separating a light phase product from a feed stream comprising a light phase and a heavy phase, which method may be implemented in a light phase product recovery sub-system (referred to herein as an oil recovery sub-system, although also applicable to other light phase products) such as described herein. The example of FIG. 1 is a two-step separation process, including an initial separation process 100 and a final separation process 200. The example of FIG. 1 may also include an optional feed stream processing procedure 26, if desirable, for example to make the feed stream more compatible with separation devices used in the light phase product recovery process.

As shown in FIG. 1, a feed stream (the process feed stream) comprising a light phase and a heavy phase (for example a fermentation-derived feed stream such as any of beer, whole stillage, thin stillage or syrup) 15 is directed into an initial separation device 20 which separates the feed stream 15 into the final separation feed stream 30 (a light phase discharge stream) and a heavy phase discharge stream 40. The final separation feed stream comprises more light phase than the heavy phase discharge stream, and the heavy phase discharge stream comprises more heavy phase than light phase. The final separation feed stream 30 is directed into a final separation device 50 which produces a light-phase product containing discharge stream 60 and a recycle stream 70. The recycle stream 70 is combined with the feed stream 15 for the initial separation device 20.

In some embodiments, separation device 20 is any device which can separate a stream comprising a light phase and a heavy phase into a dirty light phase and a clean heavy phase. In some such embodiments, separation device 20 is an inner-rising disk-stack centrifuge. In some embodiments, separation device 50 is any device which can separate a stream comprising a light phase and a heavy phase into a clean light phase and a dirty heavy phase. In some such embodiments, separation device 50 is an outer-rising disk-stack centrifuge.

The ratio of light phase to heavy phase in each stream may depend on the specific separation device used. With respect to disk-stack centrifuges, which are configured with rising holes in the disks, the location of the holes in the disks relative to the center axis influences the extent to which the dirty phase may be contaminated by the clean phase (and which of the two phases, heavy or light, will be the clean phase). For example, a typical inner rising disk-stack centrifuge in which the holes are located nearby the proximal end of the disks (i.e. nearby the center axis) may result in a relatively clarified heavy phase and dirty light phase. By contrast a typical outer rising disk stack centrifuge in which the holes are located nearby the distal edges of the disks may result in a relatively clarified light phase and dirty heavy phase. As used herein, the term "inner-rising disk stack centrifuge" means a disk-stack centrifuge wherein the rising channels are on average off-center and located toward the proximal end of the disks. Likewise, as used herein, the term "outer-rising disk stack centrifuge" means a disk-stack centrifuge wherein the rising channels are on average off-center and located toward the distal end of the disks. Disk stack centrifuges herein, including inner-rising and outer-rising disk stack centrifuges, may be off-the-shelf models or may be specially designed to achieve the desired split of light phase to heavy phase in a discharge stream.

As a person of skill should understand from reading this disclosure, the overall efficiency of the separation process (the percent of light phase product which may be recovered) is predominately determined by the initial separation process 100 and specifically the amount of light phase lost to the heavy phase in heavy phase discharge stream 40. However, the lower the ratio of light phase to heavy phase, i.e. the cleaner the heavy phase, in the heavy phase discharge stream 40, the greater the volume of liquid which must be handled by downstream separation device 50, generally resulting in a larger size device and increased cost. Accordingly, the ratio of light phase to heavy phase in each of the streams is a design-specific choice, which may driven in part by the desired balance of efficiency and cost. The amount of light phase lost to heavy phase in the heavy phase discharge stream (and accordingly the choice of efficiency versus cost) may, for example, be addressed by the choice of, design and/or use of the specific disk-stack centrifuge. For example, a person of skill could design a disk stack centrifuge optimized to achieve the desired split of light phase to heavy phase for each separation by modifying parameters including, among other things, the layout and design of disks, number of disks, angle of disks, and hole location.

In some embodiments, the fermentation-derived stream 10 may undergo a processing procedure 26 prior to the initial separation step. For example, in some embodiments, wherein the fermentation-derived feed stream 10 initially contains an amount of solids (for example beer), the process involves reducing the amount of solids to a level that is compatible with the initial separation device 20. In some embodiments, reducing the amount of solids involves passing the feed stream 10 through a decanter 25, which results in a solids discharge stream 5 and a reduced-solids feed stream 15.

Figure 3:
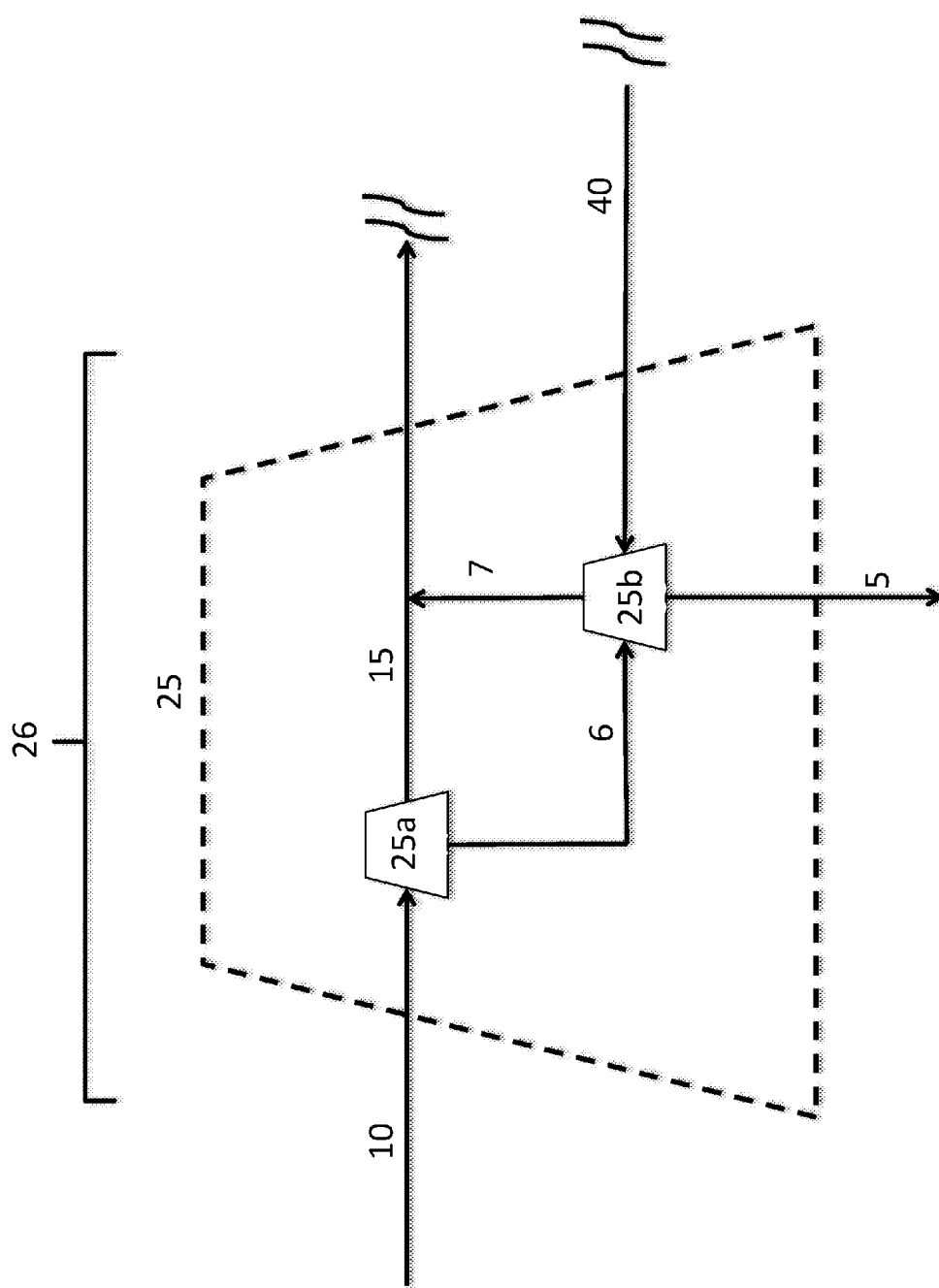
FIG. 3 is a process flow diagram illustrating certain optional embodiments for processing the process feed stream prior to separation.

As shown in FIG. 3, some embodiments involving a solids-reducing step, also involve a washing step for removing at least a portion of any light phase that may be present in the solids-containing discharge stream. At least a portion of heavy phase discharge stream 40 may be directed for use as the washing fluid. As implied by the dashed lines in FIG. 3, decanter 25 may in fact be a first decanter 25*a* for removing solids from fermentation-derived stream 10 and a second decanter 25*b* for washing solids-containing discharge stream 6 with heavy phase discharge stream 40, or decanter 25 may be a specially modified decanter that accomplishes the functions of both solids-removing decanter 25*a* and washing decanter 25*b*. In either case, the combination of removing solids and washing produces a solids-containing discharge stream 5 and a light phase discharge stream 7. Light phase discharge stream 7 can be combined with feed stream 15 thereby reducing loss of product that may otherwise occur as a result of the solids-reducing step.

Figure 2:
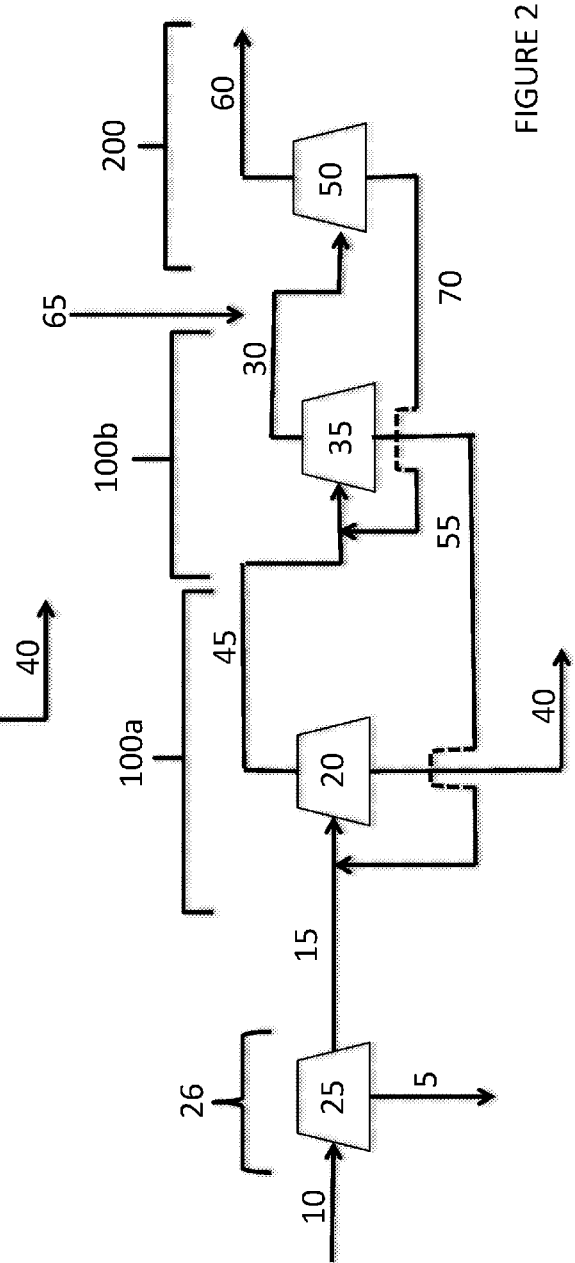
FIG. 2 is process flow diagram of another embodiment of a method according to this disclosure.

The methods herein are not limited to a two-step separation process, but may include two or more separations. FIG. 2 is a process flow diagram of an embodiment of a three-step separation process in accordance with this disclosure, in which the multi-step separation process involves a two-step initial separation 100*a*, 100*b* and a single-step final separation 200. As shown, fermentation-derived feed stream 15 is separated by a first initial separation device 20 into a first light phase discharge stream 45 and heavy phase discharge stream 40. The first light phase discharge stream 45 is then separated by a second initial separation device 35 into a second light phase feed stream (also the final separation feed stream) 30 and enriched discharge stream 55. In the illustrated embodiment, enriched discharge stream 55 is recycled into fermentation-derived feed stream 15. In other embodiments, enriched discharge stream 55 may be combined with primary discharge stream 40 from which ethanol may be later recovered. Alternatively, in other embodiments, enriched discharge stream 55 may simply be discharged from the process. Finally, as in the embodiment of FIG. 1, final separation feed stream 30 is separated into an oil-containing (light phase) stream 60 and a recycle (heavy phase) stream 70, which is combined with preliminary output feed stream 45.

Similar to the embodiment of FIG. 1, in some embodiments, first initial separation device 20 may be any device capable of separating a stream comprising a light phase and a heavy phase into a dirty light phase and a clean heavy phase, such as an inner-rising disk-stack centrifuge. Likewise, in some embodiments, final separation device 50 may be any separation device capable of separating the final separation feed stream into clean light phase and a dirty heavy phase, such as an outer-rising disk-stack.

In analogy to the two-step separation embodiment of FIG. 1, in embodiments wherein both enhanced discharge stream 55 and recycle stream 70 are recycled back into the light phase product recovery process, the overall efficiency of the separation process is predominately determined by the first initial separation 20 and specifically the amount of light phase that is lost to the heavy phase in heavy phase discharge stream 40. However, an entirely pure heavy phase, even if achievable, is not always desirable because the lower the ratio of light phase in the heavy phase discharge stream 40, results in a greater volume of liquid which must be handled by downstream separation devices potentially requiring larger devices leading to increased costs. Accordingly, the ratio of light phase to heavy phase in each of the streams is a design-specific choice, which may be driven in part by the desired balance between efficiency and cost. With those considerations in mind, in some embodiments, a three-stage separation may be advantageous over a two-step separation process because it may enable the use of smaller downstream separation devices, which despite being two devices rather than one may still result in an overall lower total cost.

Further, a three-stage separation process may have particular applicability to recovery of light phase products from feed streams in which the light phase comprises an emulsion. FIG. 2, in particular, illustrates the recovery of oil from a fermentation beer, in which the light phase may include, for example, from 25% to 95% emulsion depending on the specific feedstock-to-ethanol conversion process. Because fermentation beer may include a level of solids which isn't compatible (isn't preferable for use) with disk-stack centrifuges, the separation process also includes a preliminary solids-removal step. Here the fermentation beer 10 is passed through a decanter 25 to provide a fermentation-derived stream 15 in which the level of solids has been brought to an appropriate level, compatible with the disk-stack separation device 35. (As suggested above, in some embodiments decanter 25 is a separation device that reduces the amount of solids present in fermentation-derived stream 10. Alternatively, in some embodiments, decanter 25 is a separation device that reduces the amount of solids in the fermentation-derived stream and reduces the amount of light phase which may be present in the solids-containing discharge stream. Or, alternatively in some other embodiments, decanter 25 is a first solids-reducing decanter 25*a* for reducing the amount of solids in fermentation-derived stream 10 and a second washing decanter 25*b* for reducing the amount of light phase in the solids-containing discharge stream from decanter 25*a*.)

In any case, as shown in FIG. 2, fermentation-derived stream 15 is passed through a first inner-rising disk-stack centrifuge 20 which may be configured to minimize the loss of light phase to heavy phase in the primary heavy phase discharge stream 40 bearing in mind a potential desire to limit the volume of first light phase discharge stream 45 to achieve a desired cost-effective solution (i.e. balance the loss of light phase to heavy phase with the cost of using larger separation equipment). Thereafter, first light phase discharge stream 45 is passed through a center-rising disk-stack centrifuge 35 configured to optimize the concentration of the emulsion in the light phase with respect to efficiently breaking the emulsion with chemicals 65, which are added to the final separation feed stream 30. Finally, after the emulsion is broken, the final separation feed stream 30 is separated by an outer-rising disk-stack centrifuge 50 into a clean, oil-containing stream 60 and recycle stream (dirty heavy phase stream) 70 which is combined with first light phase discharge stream 45. Because the second initial separation has little to no effect on product yield (one of the discharge streams is further processed downstream and the other discharge stream is recycled back into the upstream process), including a second initial separation step permits greater tolerance as to the content of light phase in the final separation feed stream to achieve a desired yield without concern for losses in the enriched discharge stream. Also, because the volume of final separation feed stream 30 is reduced compared to process feed stream 15, fewer emulsion-breaking chemicals are needed if added just prior to the final separation 200 as compared to if added prior to the initial separation 100. The recycle of dirty heavy phase discharge stream 70 also ultimately permits use of fewer emulsion-breaking chemicals as these may also be recycled into the system with dirty heavy phase discharge stream 70.

The present disclosure also relates to systems for recovering a light phase product from a heavy phase product. In some embodiments, the system is an oil-containing, grain-based feedstock-to-ethanol (for example a corn-to-ethanol) system which includes an ethanol fermentation system for producing beer from feedstock sugars, and an oil recovery system in fluid communication with the ethanol fermentation system. However, the system may be adapted by a person of skill in the art basis this disclosure to recovering other light phase products from streams comprising a light phase and a heavy phase. In any case, the oil recovery system is configured to recover the oil directly from the beer or indirectly from the beer such as from the whole stillage, thin stillage, or syrup. In some embodiments, the oil recovery system includes: an initial separation sub-system configured to separate a fermentation-derived stream including a light phase and a heavy phase into a final separation feed stream and a heavy phase discharge stream, wherein the final separation feed stream comprises more light phase as compared to the heavy discharge stream, and the heavy phase discharge stream comprises more heavy phase than light phase; and, a final separation sub-system configured to separate the final separation feed stream (or stream derived therefrom) into an oil-containing stream and a recycle stream and configured to direct the recycle stream into a feed stream for a separation upstream of the final separation, for example the recycle stream may combine with a feed stream for the initial separation sub-system (the process feed stream).

The initial separation sub-system may comprise one or more separation devices in fluid communication with one another, and the final oil-recovery sub-system may also comprise one or more separation devices in fluid communication with one another. In some embodiments, each separation device subsequent to the first device, whether part of the initial separation sub-system or final oil-recovery sub-system, provides a feed stream for a downstream separation device and a recycle stream for combination with a feed stream for an upstream separation device. In some embodiments, the initial separation sub-system produces: i) a first discharge stream which is a dirty light phase stream that serves as the final separation feed stream; and, ii) a second discharge stream, which is a clean heavy phase stream, whereas the final oil recovery sub-system produces: i) a first discharge stream which is a clean light phase stream (the oil-containing stream); and, ii) a second discharge stream which is a dirty heavy phase stream that serves as a recycle stream and may be combined with the final separation feed stream. In some embodiments, each feed stream generated by a separation device in the initial separation sub-system is a dirty light phase stream.

In some embodiments, the oil-recovery system is a two stage system, including two separation devices: for example, the separation device of the initial separation sub-system can be any device which separates the fermentation-derived stream into a clean light phase and dirty heavy phase, such as an inner-rising disk-stack and the separation device of the final oil-recovery sub-system can be any device which separates its feed stream into a clean light phase and a dirty heavy phase such as an outer-rising disk-stack centrifuge. In some embodiments, the oil-recovery sub-system is a three-stage system, including three separation devices: for example, two separation devices in the initial separation sub-system and one separation device in the final oil-recovery sub-system. In some embodiments, the two separation devices comprising the initial separation sub-system are a first separation device that separates a feed stream into a dirty light phase and a clean heavy phase, such as an inner-rising disk-stack centrifuge, and a second separation device for accomplishing the application-specific goal. For example, where the light-phase containing discharge stream contains an emulsion, the second separation device may be an separation device capable of achieving a desired emulsion concentration, such as a center-rising disk stack centrifuge. In further embodiments, the separation device of the final oil-recovery sub-system can be any separation device capable of separating a feed stream into a clean light phase a dirty heavy phase, such as an outer-rising disk-stack centrifuge. In some three-stage embodiments, the second initial separation device produces a feed stream for the final separation device and a discharge stream that is recycled into the feed stream for the first initial separation device, and the final separation device produces a product-containing stream and a recycle stream that is combined with the feed stream for the second initial separation device.

In other or further embodiments, the oil recovery system further includes a solids removal sub-system, an emulsion-breaking sub-system or both. The solids removal sub-system may be located upstream of and in fluid communication with the initial separation sub-system and is configured to remove at least a portion of any solids present in the fermentation-derived stream. For example, the solids removal sub-system may include one or more decanters. In some embodiments, the solids removal sub-system also washes the solids-containing stream to reduce loss of light phase to the solids-containing stream. The emulsion-breaking system may be located downstream of and in fluid communication with the initial separation sub-system and is configured to break at least a portion of any emulsion present in the final separation feed stream (i.e. a dirty light phase stream). For example, the emulsion-breaking system may be appropriate chemicals and a conduit or device for introducing the chemicals into the light phase feed stream.

Because the overall efficiency of the co-product recovery sub-system is driven to a great extent by the first initial separation device (in view of the fact that any light phase product lost to the heavy phase discharge stream is not recovered by the oil-recovery system), that first initial device may be chosen to result in one stream that contains a predominate amount, for example almost all or all, of the light phase product. However, the more efficient the first initial separation device runs in terms of recovery of light phase product, the greater than volume of liquid downstream separation devices will process, generally leading to increased size of equipment and increase costs of equipment. Accordingly, the first initial separation device may be chosen to produce a ratio of light phase to heavy phase in the discharge stream that strikes a desired balance between efficiency and equipment and operational costs.

Accordingly, in some embodiments, the first initial separation device is chosen or designed to produce two output streams from its feed stream by removing at least a portion of the light phase with the heavy phase in the discharge stream but nevertheless resulting in a clean discharge stream and a dirty co-product containing stream. The final separation device is also chosen or designed to output two streams from its feed stream but in the case of the final separation device resulting in a clean light phase stream and a dirty recycle stream. Thus, as previously mentioned, suitable choices for separation devices for the first initial separation device in the initial separation sub-system include inner-rising disk-stack centrifuges and suitable choices for separation devices for the final separation sub-system include outer-rising disk-stack centrifuges. When the initial separation sub-system includes a second separation device, such as for reducing the concentration of emulsion in the light-phase containing stream, suitable separation devices include center-rising disk stack centrifuges. Because the second initial separation may have little to no impact on product yield (light phase in one discharge stream is further processed downstream and light phase in the other discharge stream is recycled back into the system upstream), there is less need to produce a very clean heavy phase stream at the expense of producing a high volume light phase stream.

The processes and systems described herein, including those exemplified in FIGS. 1-2 (including as optionally modified by FIG. 3), may be integrated into existing ethanol production processes and systems. In some embodiments, the processes and systems are integrated into existing systems prior to beer distillation. For example, an ethanol production process which integrates the disclosed oil recovery processes may broadly comprise:
1. Combining milled flour with water to form mash;
2. Contacting the mash with enzyme(s) (e.g., comprising an alpha-amylase and/or gluco-amylase) to produce a composition comprising at least a portion of fermentable sugars;
3. Fermenting the sugars using an ethanologen (e.g., yeast) to form a product stream comprising at least a portion of oil containing liquid; and,
4. Recovering oil from the product stream according to processes disclosed herein; and,
5. Distilling the product stream to recover ethanol, wherein distilling occurs after recovering oil.

As a more specific example, step 4 above (including for example as exemplified by FIGS. 1-2, also as optionally modified by FIG. 3) may be integrated into processes, including "no-cook" (also known as "without cooking" and "cold cook") processes, described in U.S. Pat. No. 8,470,550, which is hereby incorporated by reference in its entirety and WO 2013/126561, which is also hereby incorporated by reference in its entirety, prior to distillation as described in WO 2013/126561. When integrated into such processes, oil may be recovered in a yield amount of at least about 90 weight percent based on the total percentage of oil in the product stream. Further, it is also expected that the recovered oil product should be relatively low in free fatty acids and/or low in alcohol esters (e.g. ethanol esters). In some embodiments, the free fatty acid levels of oil products according to the present disclosure can be less than 10 percent by weight of the oil product, 2 percent by weight of the oil product or less, 1.8 percent of the oil product or less, 1.6 percent of the oil product or less, or from about 0.05 percent by weight of the oil product to about 2 percent by weight of the oil product, or from about 0.1 percent by weight of the oil product to about 1.8 percent by weight of the oil product, or from about 0.4 percent by weight of the oil product to about 1.6 percent by weight of the oil product. In some or additional embodiments, the one or more alcohol esters are present in an amount of 10 percent or less by weight of the oil product, 7 percent or less by weight of the oil product, or 5 percent or less by weight of the oil product.

A number of embodiments have been described but a person of skill understands that still other embodiments are encompassed by this disclosure. It will be appreciated by those skilled in the art that changes could be made to the embodiments described above without departing from the broad inventive concepts thereof. For example, any process including at least two separation steps, in which an earlier step resulting in a clean heavy phase is followed by a later step resulting in a clean light phase may be within the scope of this disclosure. Similarly, any system including at least two separation devices in direct or indirect fluid communication with one another in which a first device separates a feed stream into a light phase and a clean heavy phase and a second device thereafter separates the light phase (or stream derived therefrom) into a clean light phase and heavy phase may be within the scope of this disclosure. It is understood, therefore, that this disclosure and the inventive concepts are not limited to the particular embodiments disclosed, but are intended to cover modifications within the spirit and scope of the inventive concepts including as defined in the appended claims. Accordingly, the foregoing description of various embodiments does not necessarily imply exclusion. For example, "some" embodiments or "other" embodiments may include all or part of "some", "other," "further," and "certain" embodiments within the scope of this invention. Methods and devices within the scope of the disclosure can also be defined in accordance with the below embodiments.

Additional Embodiments

1. A method of recovering oil from an oil-containing, grain-based feedstock-to-ethanol fermentation-conversion process, comprising:
    a. an initial (or light phase) separation using at least one separation device and resulting in separating a fermentation-derived stream into a final separation feed stream and a heavy phase discharge stream, in which the final separation feed stream comprises more light phase than the heavy phase discharge stream and the heavy phase discharge stream comprises more heavy phase than light phase;
    b. a final oil-recovery separation using at least one oil-recovery separation device and resulting in separating the final separation feed stream or stream derived therefrom into an oil-containing stream and a recycle stream; and,
    c. recycling the recycle stream into an upstream feed stream.
2. A method according to embodiment 1, wherein the initial separation comprises a first initial separation using a first initial separation device and a second initial separation using a second initial separation device.
3. A method according to embodiments 1 or 2, wherein the recycle stream is combined with a feed stream for the initial separation, such as for example the feed stream for the second initial separation.
4. A method according to any of embodiments 1-3, wherein the final separation feed stream comprises an emulsion and the process further comprises breaking the emulsion prior to the final oil-recovery separation.
5. A method according to any of embodiments 2-4, wherein the first initial separation produces a dirty light phase discharge stream and the heavy phase discharge stream, which is a clean heavy phase discharge stream, from the fermentation-derived stream, the second separation produces the final separation feed stream and an enriched discharge stream from the dirty light phase discharge stream.

6. A method according to embodiment 2, wherein the light phase of the fermentation-derived stream comprises an emulsion, the process further comprises adding chemicals to the final separation feed stream to break the emulsion, the first initial separation is configured to minimize loss of emulsion to the heavy phase discharge stream and the second initial separation is configured to optimize emulsion concentration in final separation feed stream for compatibility with the emulsion breaking.

7. A method according to embodiment 6, wherein the enriched discharge stream is recycled into the fermentation-derived stream and the recycle stream is recycled into the final separation feed stream.

8. A method according to claim embodiment 5, wherein the enriched discharge stream is combined with the fermentation-derived stream for use as a feed stream for the first initial separation, is discharged from the feedstock-to-ethanol fermentation system, or is combined with the heavy phase discharge stream.

9. A method according to any of embodiments 1-8, wherein the fermentation-derived stream comprises an amount of solids, and the method further comprises reducing the amount of solids in the fermentation-derived stream prior to the initial separation.

10. A method according to embodiment 9, wherein the amount of solids are reduced to less than about 3% by weight of the fermentation-derived stream.

11. A method according to embodiment 9, wherein the amount of solids is reduced to a level that is compatible with the initial separation.

12. A method according to any of embodiments 1-11, wherein the fermentation-derived stream is chosen from beer, whole stillage, thin stillage, and syrup.

13. A method according to any of embodiments 1-12, wherein the fermentation-derived stream is beer.

14. A method according to any of embodiments 1-13, wherein the separation devices are chosen from decanters and centrifuges.

15. A method according to any of embodiments 2 and 6-8, wherein the first initial separation device is an inner-rising disk-stack centrifuge, the second initial separation device is a center-rising disk-stack centrifuge and the final oil-recovery separation device is an outer-rising disk-stack centrifuge.

16. A method according to embodiment 15, wherein the fermentation-derived feed stream, for example beer, comprises an amount of solids, and the method further comprises reducing the amount of solids in the fermentation-derived feed stream, for example to about 3% or less by weight of the stream.

17. A method according to any of embodiments 9-11 or 16, further comprising: washing a solids-containing stream (produced when the solids are removed from the fermentation-derived stream) using at least a portion of the heavy phase discharge stream from the initial separation to recover at least a portion of any light phase which may be present in the solids-containing stream; and, combining the recovered light phase with a feed stream for the initial separation such as the solids-reduced fermentation-derived stream.

18. A method according to any of embodiments 1-17, wherein the feedstock is corn.

19. A method according to any of embodiments 1-18, further comprising recovering ethanol from the primary (heavy phase) discharge stream.

20. A method according to embodiment 18, wherein at least greater than about 40%, at least about 45%, at least about 50%, at least greater than about 53%, at least about 55%, at least about 60%, at least about 65%, at least about 70%, at least about 75%, at least about 80%, at least about 85%, at least about 90%, at least about 95%, or at least about 97% by weight of the oil in the in fermentation-derived stream is recovered.

21. A method according to any of embodiments 1-20 in which the the oil-containing stream is a clean light phase stream and the recycle stream is a dirty heavy phase stream.

22. A method according to any of embodiments 1-21 in which the final separation feed stream is a dirty light phase stream, the heavy phase discharge stream is a clean heavy phase stream, the oil-containing stream is a clean light phase stream and the recycle stream is a dirty heavy phase stream.

23. An oil-containing, grain-based feedstock-to-ethanol fermentation system, comprising:
  a. an ethanol fermentation system which produces beer from feedstock sugars; and,
  b. an oil recovery system in direct or indirect fluid communication with the ethanol fermentation system for recovering oil present in the beer; wherein, the oil recovery system comprises:
    i. an initial separation sub-system configured to separate a fermentation-derived feed stream comprising a light phase and a heavy phase into a final separation feed stream and a heavy phase discharge stream, in which the final separation feed stream comprises more light phase than the heavy phase discharge stream and the heavy phase discharge stream comprises more heavy phase as compared to light phase, and wherein the fermentation-derived stream and the final separation stream each may also comprise an emulsion;
    ii. a final separation sub-system configured: to separate oil from the final separation feed stream or a stream derived from the final separation feed stream; to produce a recycle stream; and, to direct the recycle stream into an upstream feed stream.

24. A system according to embodiment 23, wherein the initial separation sub-system comprises an inner-rising disc-stack centrifuge and the final separation sub-system comprises an outer-rising disc-stack centrifuge.

25. A system according to embodiment 23, wherein the initial separation sub-system comprises an inner-rising disc-stack centrifuge in upstream fluid communication with a center-rising disc-stack centrifuge, wherein the inner-rising disc-stack centrifuge is configured to separate the fermentation-derived stream into a dirty light phase discharge stream comprising an emulsion and a clean heavy phase discharge stream, and the center-rising disc-stack centrifuge is configured to concentrate the emulsion in the dirty light phase discharge stream by separating the dirty light phase discharge stream into the final separation feed stream and an enriched discharge stream, which enriched discharge stream may be discharged from the feedstock-to-ethanol fermentation system, or combined with clean heavy phase discharge stream, or recycled and combined with the fermentation-derived stream.

26. A system according to any of embodiments 23-25, wherein the final separation feed stream is a dirty light phase stream, the heavy phase discharge stream is a clean heavy phase stream, the oil-containing stream is a clean light phase stream, and the recycle stream is a dirty heavy phase stream.

27. A system according to any of embodiments 23-26, wherein the oil recovery system also comprises a solids removal sub-system located upstream of and in fluid communication with the initial separation sub-system, wherein the solids removal sub-system is configured to remove at least a portion of the solids present in the fermentation-derived stream, for example to result in the fermentation-derived stream containing no more than about 3% solids by weight, or for example, no more solids than would be suitable for the upstream separation devices, and wherein the solids-removal subsystem may also be configured to wash a solids-containing stream produced by the subsystem to recover at least a portion of any light phase that may be present in the solids-containing stream.

28. A system according to embodiment 27, wherein the washing fluid for the solids-removal sub-system is at least a portion of the heavy phase discharge stream from the initial separation and the solids-removal sub-system is configured to direct recovered light phase into a feed stream for the initial separation, such as for example into the solids-reduced, fermentation-derived stream.

29. A system according to embodiments 27 or 28, wherein the solids removal sub-system comprises one or more decanters.

30. A system according to any of embodiments 23-29, further comprising an emulsion-breaking sub-system located downstream of and in fluid communication with the initial separation sub-system, which emulsion-breaking sub-system is configured to break at least a portion of any emulsion present in the final separation feed or a stream from which the final separation feed stream is derived.

31. A method according to embodiment 4, wherein the final separation feed stream also comprises free oil.

32. A method according to embodiment 6, wherein the fermentation-derived stream also comprises free oil.

33. The methods or systems of the above embodiments as applied to any stream comprising a light phase and a heavy phase, wherein the desired product is a light phase product.

What is claimed is:

1. A method of recovering oil from an oil-containing, grain-based feedstock-to-ethanol fermentation-conversion process, comprising:
   a. an initial separation comprising separating a fermentation-derived stream into a final separation feed stream and a heavy phase discharge stream using at least a first initial separation device, wherein the final separation feed stream comprises more light phase than the heavy phase discharge stream and the heavy phase discharge stream comprises more heavy phase than light phase;
   b. a final separation comprising separating the final separation feed stream into an oil-containing stream and a recycle stream using at least a first oil-recovery separation device;
   c. recycling the recycle stream into a feed stream for the initial separation; and,
   d. recovering ethanol from the heavy phase discharge stream.

2. A method according to claim 1, wherein the initial separation comprises a first initial separation using a first initial separation device and a second initial separation using a second initial separation device.

3. A method according to claim 2, wherein the fermentation-derived stream comprises an emulsion and the process further comprises breaking the emulsion prior to the final separation.

4. A method according to claim 2, wherein the first initial separation produces a dirty light phase feed stream and a clean heavy phase discharge stream from the fermentation-derived stream, the second separation produces the final separation feed stream and an enriched discharge stream from the dirty light phase discharge stream, and the final separation produces a clean light phase stream, which is the oil-containing stream, and a dirty heavy phase stream, which is the recycle stream.

5. A method according to claim 4, wherein the enriched discharge stream is recycled into the fermentation-derived stream for use as a feed stream for the first initial separation.

6. A method according to claim 2, wherein the first initial separation device is an inner-rising disk-stack centrifuges, the second initial separation device is a center-rising disk-stack centrifuge and the final oil-recovery separation device is an outer-rising disk-stack centrifuge.

7. A method according to claim 1, wherein the fermentation-derived stream comprises an amount of solids, and the method further comprises reducing the amount of solids in the fermentation-derived stream prior to the initial separation.

8. A method according to claim 7, further comprising washing a solids-containing stream with at least a portion of the heavy phase discharge stream to recover light phase and recycling the recovered light phase into the solids-reduced fermentation-derived stream.

9. A method according to claim 1, wherein the fermentation-derived stream is chosen from beer, whole stillage, thin stillage, and syrup.

10. A method according to claim 9, wherein the fermentation-derived stream is beer and the feedstock is corn.

11. A method according to claim 1, wherein the separation devices are chosen from decanters and centrifuges.

* * * * *